United States Patent
Auvenshine et al.

(10) Patent No.: US 11,153,291 B2
(45) Date of Patent: *Oct. 19, 2021

(54) NON-DISRUPTIVE SYSTEM FOR VERIFYING DEFAULT PASSWORDS HAVE BEEN CHANGED WITHOUT CAUSING SECURITY LOCKOUTS

(71) Applicant: International Business Machines Corporation, Armonk, NY (US)

(72) Inventors: John J. Auvenshine, Tucson, AZ (US);
Per Lutkemeyer, Lystrup (DK);
Christian Sonder, Aarhus N (DK)

(73) Assignee: International Business Machines Corporation, Armonk, NY (US)

( * ) Notice: Subject to any disclaimer, the term of this patent is extended or adjusted under 35 U.S.C. 154(b) by 151 days.

This patent is subject to a terminal disclaimer.

(21) Appl. No.: 16/568,486

(22) Filed: Sep. 12, 2019

(65) Prior Publication Data
US 2020/0007521 A1   Jan. 2, 2020

Related U.S. Application Data

(63) Continuation of application No. 15/673,877, filed on Aug. 10, 2017, now Pat. No. 10,581,821.

(51) Int. Cl.
*H04L 29/06* (2006.01)
*G06F 21/46* (2013.01)

(52) U.S. Cl.
CPC ............ *H04L 63/068* (2013.01); *G06F 21/46* (2013.01); *H04L 63/083* (2013.01)

(58) Field of Classification Search
CPC ............................ H04L 63/068; H04L 63/083
(Continued)

(56) References Cited

U.S. PATENT DOCUMENTS 7,454,791 B1   11/2008   Godwin
7,552,467 B2    6/2009   Lindsay
(Continued)

FOREIGN PATENT DOCUMENTS

DE   102014104640 A1   10/2015
WO   WO 2014191180      12/2014

OTHER PUBLICATIONS

Larry Holt, Increasing Real-World Security of User IDS and Passwords, Retrieved from Internet: URL:http://dl.acm.org/citation.cfm?id=2047461, 2011, 1 page.
(Continued)

*Primary Examiner* — Mohammad W Reza
(74) *Attorney, Agent, or Firm* — Schmeiser, Olsen & Watts, LLP; Nicholas L. Cadmus

(57) ABSTRACT

A method for verifying that default passwords have been changed without causing a security lockout, is provided, including enabling user identifiers associated with a plurality of devices, prior to an initial security test, identifying, a default password for a user identifier of each device, attempting a login to each device using the default password for the user identifier of each device, wherein: in response to determining that the login is successful, raising an alert against the user identifier as a security concern and maintaining an enabled state of the user identifier, in response to determining that the login is unsuccessful, disabling the user identifier so that the user identifier is in a non-enabled state, until a security lockout interval elapses, and retrying the login only for each user identifier in an enabled state during one or more subsequent security tests initiated after a predetermined alert interval.

20 Claims, 7 Drawing Sheets

(58) Field of Classification Search
USPC .............................................................. 726/6
See application file for complete search history.

(56) References Cited

U.S. PATENT DOCUMENTS

| | | |
|---|---|---|
| 8,051,098 B2 | 11/2011 | Bisbee |
| 8,312,540 B1 * | 11/2012 | Kahn .................. H04L 63/1425 726/22 |
| 8,316,438 B1 | 11/2012 | Steve |
| 9,104,879 B1 | 8/2015 | Machado et al. |
| 10,110,578 B1 | 10/2018 | Baer et al. |
| 2015/0326556 A1 * | 11/2015 | Vadura ................ H04L 63/0815 726/4 |
| 2016/0014139 A1 | 1/2016 | Saraf et al. |
| 2016/0373258 A1 | 12/2016 | Bone et al. |
| 2019/0052615 A1 | 2/2019 | Auvenshine et al. |

OTHER PUBLICATIONS

Office Action (dated Mar. 8, 2019) for U.S. Appl. No. 15/673,877, filed Aug. 10, 2017.
Amendment (dated Jun. 10, 2019) for U.S. Appl. No. 15/673,877, filed Aug. 10, 2017.
Notice of Allowance (dated Jun. 26, 2019) for U.S. Appl. No. 15/673,877, filed Aug. 10, 2017.
Mell, Peter et al.; "The NIST Definition of Cloud Computing;" National Institute of Standards and Technology; Special Publication 800-145; Sep. 2011; 7 pages.

\* cited by examiner

NON-DISRUPTIVE SYSTEM FOR VERIFYING DEFAULT PASSWORDS HAVE BEEN CHANGED WITHOUT CAUSING SECURITY LOCKOUTS This application is a continuation application claiming priority to Ser. No. 15/673,877, filed Aug. 10, 2017, now U.S. Pat. No. 10,581,821 issued Mar. 3, 2020.

FIELD OF TECHNOLOGY

The present invention relates to systems and methods for verifying default passwords have been changed, and more specifically to embodiments of verifying default passwords have been changed without causing a security lockout.

BACKGROUND

Devices are often delivered to users with a default user identifier and password to initially access the device. A security risk exists if the default password is not changed.

SUMMARY

An aspect of this invention relates to a method, and associated computer system and computer program product, verifying that default passwords have been changed without causing a security lockout. A processor of a computing system enables for testing, user identifiers associated with a plurality of devices, prior to an initial security test. A default password is identified for a user identifier of each device of the plurality of devices. A login to each device is attempted using the default password for the user identifier of each device, wherein: in response to determining that the login is successful, raising an alert against the user identifier as a security concern and maintaining an enabled state of the user identifier, and in response to determining that the login is unsuccessful, disabling the user identifier so that the user identifier is in a non-enabled state, until a security lockout interval elapses. The login is retried only for each user identifier in an enabled state during one or more subsequent security tests initiated after a predetermined alert interval.

DETAILED DESCRIPTION

Devices often ship with a default user identifier and a default password. If the default password is not changed, the device and potentially a network of devices coupled thereto may be exposed for a large security breach because the default password is usually public knowledge. Health checking systems may periodically check the devices to see if the default user identifier and default password allow logins, and raise alerts if the default password allows access to the devices. However, if the device being checked contains security measures which limit the number of incorrect password entries, automated auditing systems designed to detect if the default password has been changed may trigger security alerts and/or lockouts by repeatedly attempting logins with default passwords that have been changed. If such an auditing system checks the default password only once, the auditing system will never detect if the device is reset to defaults, which can happen if there are severe hardware or software problems. For instance, a device may be sent for repair at the manufacturer, or some firmware code upgrades, and restored to allowing access using a default user identifier and default password.

Thus, a need exists for frequently testing devices to ensure that default user identifiers and/or default passwords have been changed, while also remaining non-disruptive to the device and avoiding a security lockout based on multiple failed attempts in situations where a user has changed the default login information.

Figure 1:
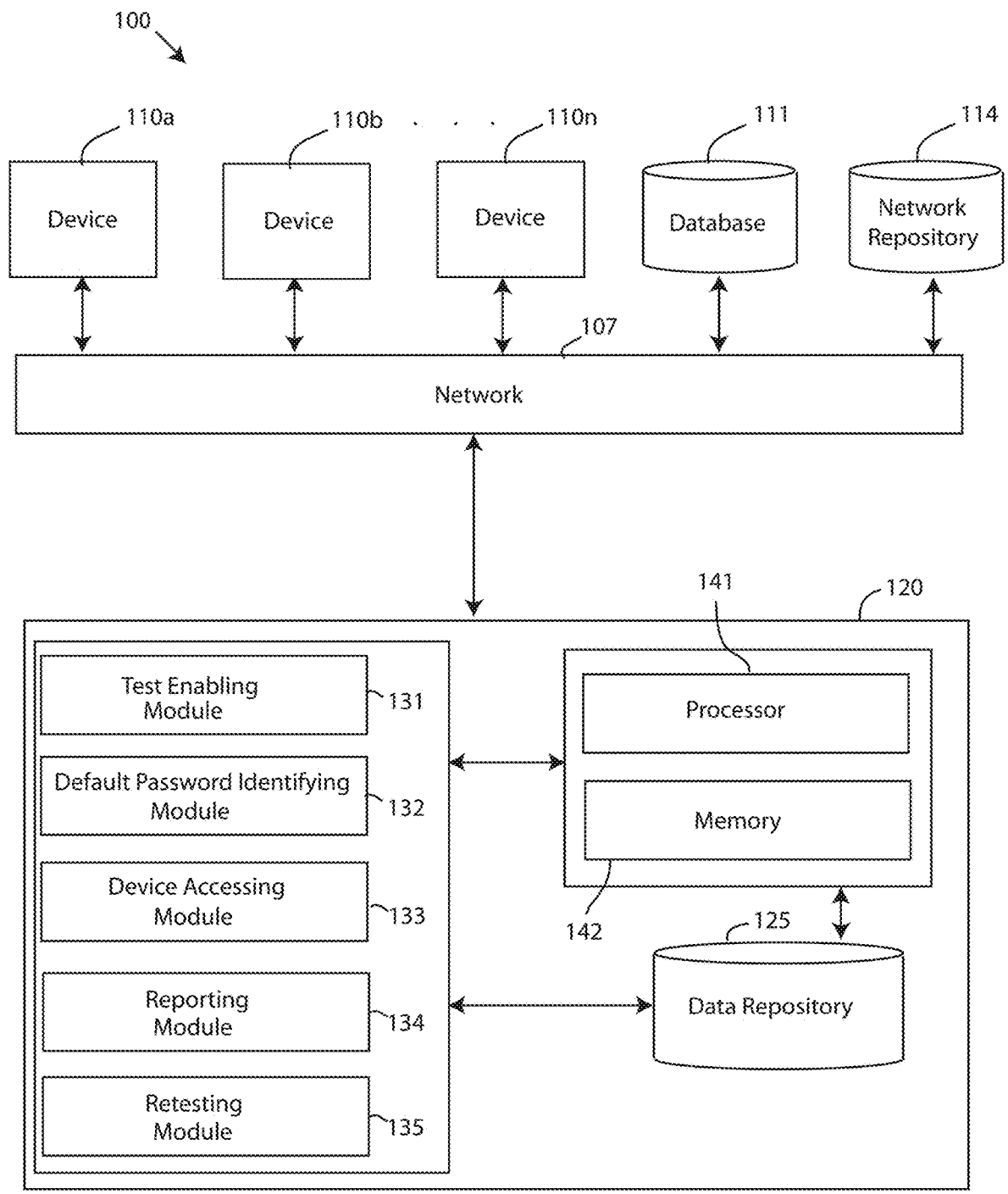
FIG. 1 depicts a block diagram of a security verification system, in accordance with embodiments of the present invention.

Referring to the drawings, FIG. 1 depicts a block diagram of a security verification system 100, in accordance with embodiments of the present invention. Embodiments a security verification system 100 may be described as a non-disruptive system for verifying that default login information (e.g. default password) has been changed to reduce or prevent security breaches and/or unauthorized access to one or more devices, without causing a security lockout so that the user cannot access the device even with the correct login information. The security verification system 100 may enable user identifiers associated with a plurality of devices to be tested, identify the default password for each user identifier for each device, and attempt to login using the default password. If the default password information has not been changed, the security verification system 100 will be able to access the device using the default login information, and may raise an alert to take corrective action (e.g. changing default password). The security verification system 100 may retest the user identifiers of the devices flagged for not having changed the default passwords, which may need to occur very frequently (e.g. daily). If the default password information has been changed, the security verification system 100 will not be allowed to login or access the particular device, but may retest the device after a prolonged interval of time, such as a security lockout interval of greater than thirty days, to ensure that the device has not been restored to default settings after the initial run through (e.g. device needs repair and login information has been restored to factory settings), without the default password being changed thereafter. Further, by waiting a prolonged period of time to retest the devices determined to have changed the default passwords, a potential for causing a security lockout due to too many failed login attempts may be reduced or wholly avoided.

Embodiments of the security verification system 100 may comprise a plurality of devices, depicted as device 110a, 110b . . . 110n, referred herein collectively as "devices 110". The reference numbers with sub-letters and/or ellipses, for example describing devices as 110a, 110b . . . 110n, may signify that the embodiments are not limited only to the amount of elements actually shown in the drawings, but rather, the ellipses between the letters and the $n^{th}$ element indicate a variable number of similar elements of a similar type. For instance, with regard to the devices 110 depicted in FIG. 1, any number of a plurality of devices 110 may be present up to the $n^{th}$ number of components 110n, wherein the variable "n" may represent the last element in a sequence of similar elements shown in the drawing. Embodiments of the devices 110 may be computing devices linked or otherwise coupled or connected to form a larger network of computing devices. Embodiments of the devices 110 may include a computer, computing system, a computing device, a computer network, a server, a terminal, a point of sale terminal, desktop computer, a laptop or mobile computer, tablet computer, mobile device, smartphone, cellular phone, and the like. Each device 110 may be associated with one or more user identifiers and passwords (i.e. login information) that may permit access to the device and potentially to a network of computers and/or storage system coupled to accessible by the device 110.

Moreover, embodiments of the devices 110 may be coupled to a computing system 120 over a network 107. In an alternative embodiment, one or all of the devices 110 may be connected to computing system 120 via a data bus line. The number of devices 110 connecting to computer system 120 over network 107 may vary from embodiment to embodiment, and may be dependent on the size and/or scope of the security test(s) performed by the computing system 120. As shown in FIG. 1, the devices 110 may be accessed by the computing system 120 for attempting a login to the device 110 over the network 107. A network 107 may refer to a group of two or more computer systems linked together. Network 107 may be any type of computer network known by individuals skilled in the art. Examples of computer networks 107 may include a LAN, WAN, campus area networks (CAN), home area networks (HAN), metropolitan area networks (MAN), an enterprise network, storage area networks (SAN), cloud computing network (either physical or virtual) e.g. the Internet, a cellular communication network such as GSM or CDMA network or a mobile communications data network. The architecture of the computer network 107 may be a peer-to-peer network in some embodiments, wherein in other embodiments, the network 107 may be organized as a client/server architecture.

In some embodiments, the network 107 may further comprise, in addition to the computer system 120 and devices 110, a connection to one or more network accessible knowledge bases containing information of one or more users, network repositories 114 or other systems connected to the network 107 that may be considered nodes of the network 107. In some embodiments, where the computing system 120 or network repositories 114 allocate resources to be used by the other nodes of the network 107, the computer system 120 and network repository 114 may be referred to as servers.

The network repository 114 may be a data collection area on the network 107 which may back up and save all the data transmitted back and forth between the nodes of the network 107. For example, the network repository 114 may be a data center saving and cataloging data sent by or received from the devices 110 to generate both historical and predictive reports regarding an enabling state of the devices 110 or stored login information of the devices 110. In some embodiments, a data collection center housing the network repository 114 may include an analytic module capable of analyzing each piece of data being stored by the network repository 114. Further, the computer system 120 may be integrated with or as a part of the data collection center housing the network repository 114. In some alternative embodiments, the network repository 114 may be a local repository (not shown) that is connected to the computer system 120.

Referring still to FIG. 1, embodiments of the computing system 120 may include a test enabling module 131, a default password identifying module 132, a device accessing module 133, a reporting module 134, and a retesting module 135. A "module" may refer to a hardware based module, software based module or a module may be a combination of hardware and software. Embodiments of hardware based modules may include self-contained components such as chipsets, specialized circuitry and one or more memory devices, while a software-based module may be part of a program code or linked to the program code containing specific programmed instructions, which may be loaded in the memory device of the computer system 120. A module (whether hardware, software, or a combination thereof) may be designed to implement or execute one or more particular functions or routines.

Embodiments of the test enabling module 131 may include one or more components of hardware and/or software program code for enabling, for testing, user identifiers associated with a plurality of devices 110, prior to an initial security test. For instance, an initial security test may be performed to check if default passwords for user identifiers that provide access to devices 110 have been changed for computer security purposes. The initial security test may be a first run through for the plurality of devices 110, wherein each user identifier may be enabled so that the computing system 120 performs a check on each available or known user identifier. In other words, before a first run through, embodiments of the test enabling module 131 of computing system 120 may enable otherwise ensure that all user identifiers on all devices 110 are in an enabled state. Thus, embodiments of the computing system 120 may evaluate each user identifier for changes to default login information.

With continued reference to FIG. 1, embodiments of the computing system 120 may also include a default password identifying module 132. Embodiments of the default password identifying module 132 may include one or more components of hardware and/or software program code for identifying a default password for a user identifier of each device 110 of the plurality of devices 110. Embodiments of the default password identifying module 132 may identify, obtain, ascertain, retrieve, etc. default password and/or default login information to be used in an attempt to access or login to the devices 110. Default password information may be identified or otherwise obtained by accessing database 111 coupled to the computing system 120. Database 111 may store known default password information or known combinations of user identifiers and passwords. The default login information may be known from manufacturer settings or specifications, which may be retrieved from database 111 or other hardware storage mediums, including data repository 125 of computing system 120. In some embodiments, the default password information may be public knowledge, which the default password identifying module 132 may utilize to obtain or otherwise identify the default password. Accordingly, embodiments of the default password identifying module 132 may identify or otherwise obtain default passwords for enabled user identifiers associated with the plurality of devices 110, which may be used to automatically attempt a login to devices 110 via computing system 120.

Embodiments of the computing system 120 may include a device accessing module 133. Embodiments of the device accessing module 133 may include one or more components of hardware and/or software program code for attempting a login to each device 110 using the default password for the user identifier of each device 110. For instance, embodiments of the device accessing module 133 may utilize the obtained default passwords to attempt a login to each device 110 for each enabled user identifier. In an exemplary embodiment, the device accessing module 133 may attempt only a single login during the initial or subsequent security tests. In other words, the device accessing module 133 may only once attempt to login with default password to avoid causing a security lockout of the device 110.

In response to determining that the login is successful, embodiments of the device accessing module 133 of computing system 120 may raise an alert against the user identifier as a security concern and maintain an enabled state of the user identifier. For example, a successful login attempt using the default password may mean that a user, operator, administrator, etc. of a particular device 110 has not changed the login information from the default login information. Because certain default login information (i.e. passwords and user identifiers) may be public knowledge or relatively easy to obtain, an unauthorized party may gain access to the device 110, which may represent a serious security concern. Thus, the device accessing module 133 may raise an alert or otherwise flag the device 110 and/or user identifier that a security concern exists.

Additionally, embodiments of the device accessing module 133 may maintain the enabled state of the user identifier that resulted in a successful login attempt using the default password. Maintaining the enabled state of the user identifier may mean that a subsequent security test may once again attempt a login using default password for the enabled user identifier. Subsequent run-throughs of the security test may be performed after an alert interval has passed from a conclusion of the initial security test. Embodiments of the alert interval may be an amount of time that the computing system 120 may wait to initiate a subsequent security test for enabled user identifiers. In an exemplary embodiment, the alert interval time may be 24 hours, which means that a subsequent security test may be performed daily for each enabled user identifier. Further, embodiments of a predetermined alert interval may start at a conclusion of the initial security test and the one or more subsequent security tests, the conclusion occurring when the login has been attempted for each user identifier in an enabled state, for the plurality of devices 110.

A frequent (e.g. daily) check for default passwords logins may be critical for maintaining a secure network of devices 110 and device security. However, attempting multiple logins for all user identifiers, including user identifiers that have changed the login information from the default login information, may cause a lockout on devices 110 that have changed default login information. For instance, a user identifier that has a unique password and not a default password may cause a device security system to eventually lockout any user attempting to login to the device 110. A device security lockout causes a disruption in that an authorized user may be forced to go without being able to access the authorized user's computer for a period of time. Thus, embodiments of the device accessing module 133 may disable a user identifier, in response to an unsuccessful login attempt during an initial security test. For example, in response to determining that the login is unsuccessful, the computing system 120 may disable the user identifier so that the user identifier is in a non-enabled state. During one or more subsequent security tests, the device accessing module 133 may only attempt a login for user identifiers in an enabled state, thereby omitting or skipping the login attempt for user identifiers in a non-enabled state (e.g. user identifiers that have been confirmed to have changed the default login information to a unique password). By avoiding the login attempt for non-enabled user identifiers, device security systems may not encounter multiple failed login attempts, which may prevent a user from being "locked out" of the device 110 when the device security system(s) does not initiate a lockout procedure. Accordingly, the device/system/user/administrator is not disrupted by security tests seeking to detect user identifiers that have not changed the default passwords.

While skipping the login attempt for non-enabled user identifiers during one or more subsequent security tests may be an effective, non-disruptive method that avoids undesired security lockouts on devices 110 that have changed, situations occur where the user identifier/device returns or is reset to the default login information. For example, a device 110 may need repair in response to hardware or software problems, and the device 110 is returned to the user with the default login information being useable for successful logins. Various other instances may be responsible for resetting or returning the user identifier/device to default login settings, such as a firmware code upgrade, an administrator erasing an account to accommodate a brand new user, a user initiated reset to factory settings, and the like. Thus, embodiments of the device accessing module 134 may disable a user identifier, in response to determining that a login attempt was unsuccessful during a security test, such that the user identifier is in a non-enabled state until a security lockout interval elapses. Embodiments of the security lockout interval may be a prolonged period of time, greater or significantly greater than the alert interval time. For instance, embodiments of the security lockout interval may be thirty days, greater than thirty days, one month, two months, 30 months, 90 days, or greater than 90 days. In an exemplary embodiment, the security lockout interval may be a period of time great enough or a large enough window of time that avoids a device security system from recognizing frequent failed login attempts that trigger a security device lockout. Upon expiry of the security lockout interval, the user identifier may be returned to an enabled state, in which the device access module 133 may again attempt to login with a default password, as described supra.

Furthermore, enabling-state data associated with the user identifier may be stored or otherwise saved or held in a database, such that the database is accessed during the one or more subsequent security tests to determine which user identifiers to attempt the login. Embodiments of the database containing the enable-state data may be database 111 coupled to the computing system 120 over network 107, and/or data repository 125 of computing system 120. Embodiments of the device accessing module 133 may also access database 111 to determine whether a default password information is being stored for a particular user identifier, and if so, skipping a login attempt for the particular user identifier during the initial security test and the one or more subsequent security tests.

With continued reference to FIG. 1, embodiments of the computing system 120 may include a reporting module 134. Embodiments of the reporting module 134 may include one or more components of hardware and/or software program code for generating a report including each device 110 that was accessible using the default password reporting and/or alerting a user. For instance, embodiments of the reporting module 134 may communicate with a computing device associated with the user, device 110, administrator, etc. to report or otherwise provide an alert for one or more occurrences of default password successful logins so that the user/administrator may consider/develop a corrective action prior to a security breach. In other embodiments, the reporting module 134 may store enabled user identifiers in data repository 125, which may be accessed by the user. Embodiments of the reporting module 134 may further generate detailed reports regarding updates and new information extracted by the computing system 120 regarding the user identifiers and/or devices 110, and display, send, or otherwise provide the reports to the user. In some embodiments, the reporting module 134 may notify or otherwise report a result of the login attempt by the device accessing module 133. For example, the reporting module 134 may notify the user by sending a communication to a computing device that an attempted login was successful, and may suggest an appropriate action.

Embodiments of computing system 120 of the security verification system 100 may also include a retesting module 135. Embodiments of the retesting module 135 may include one or more components of hardware and/or software program code for retrying the login only for each user identifier in an enabled state during one or more subsequent security tests initiated after a predetermined alert interval. For instance, embodiments of the retesting module 135 may perform one or more security tests subsequent to an initial security test; however, user identifiers may be enabled or disabled depending on the results of the initial security test during the one or more security tests, and depending on whether the security lockout interval has expired. The retesting module 135 may therefore ensure continuing non-disruptive security tests to determine or otherwise detect user identifiers that have not changed a default password information since initial use of a device 110 or after a reset or return to default password information.

Referring still to FIG. 1, embodiments of the computer system 120 may be equipped with a memory device 142 which may store default password information, user identifiers, reports, and the like, and a processor 141 for implementing the tasks associated with the security verification system 100. Furthermore, various tasks and specific functions of the modules of the computing system 120 may be performed by additional modules, or may be combined into other module(s) to reduce the number of modules. Further, embodiments of the computer or computing system 120 may comprise specialized, non-generic hardware and circuitry (i.e., specialized discrete non-generic analog, digital, and logic based circuitry) for (independently or in combination) particularized for executing only methods of the present invention. The specialized discrete non-generic analog, digital, and logic based circuitry may include proprietary specially designed components (e.g., a specialized integrated circuit, such as for example an Application Specific Integrated Circuit (ASIC), designed for only implementing methods of the present invention).

Moreover, embodiments of the security verification system 100 may improve computer security technology and information technology environments by automatically continuing to check unchanged passwords, but suppressing checks for a significant amount of time if the default passwords have been changed. In this way, security health check systems or other security monitoring systems (e.g. computing system 120) may raise daily alerts on unchanged passwords but not miss a potential breach in security for a device that had at one time changed the default password but was restored to default login information subsequent to an initial security test. Automatically verifying default passwords have been changed without causing device lockouts for devices that are secure is an ideal technical solution having a technical effect that computer security programs are more effective in preventing breach in security while also not disrupting computer functionality.

Figure 2:
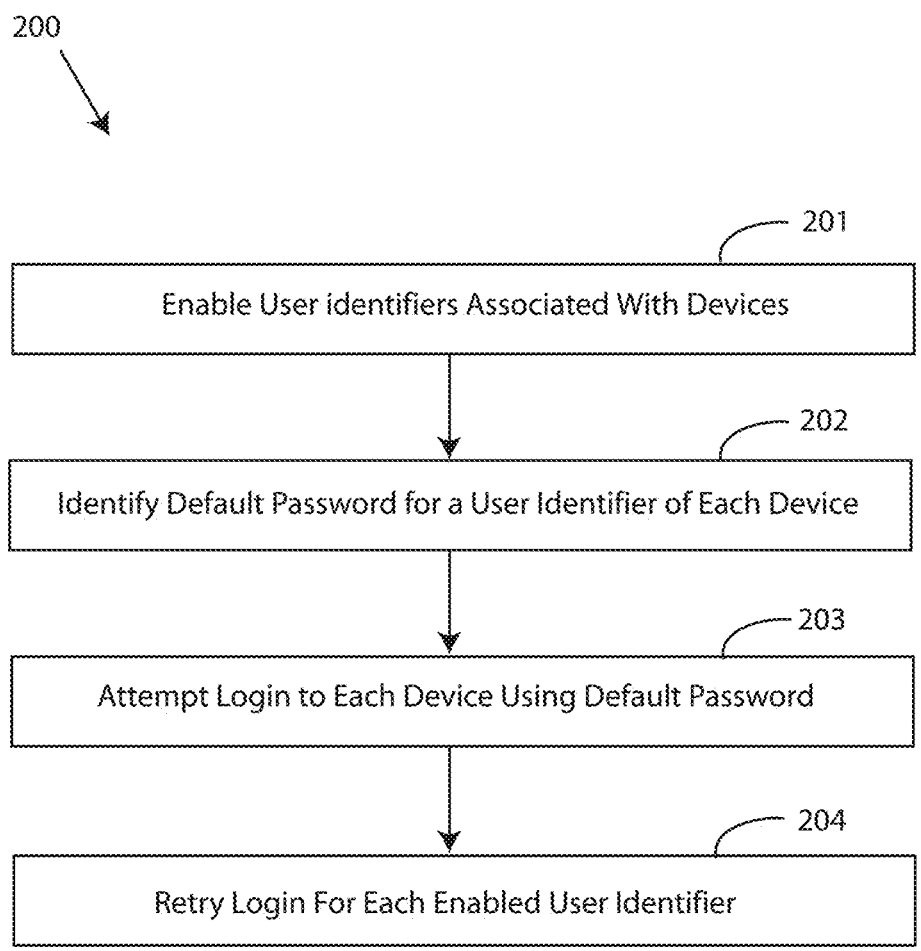
FIG. 2 depicts a flowchart of a method for verifying that default passwords have been changed without causing a security lockout, in accordance with embodiments of the present invention.

Referring now to FIG. 2, which depicts a flow chart of a method 200 for verifying that default passwords have been changed without causing a security lockout, in accordance with embodiments of the present invention. One embodiment of a method 200 or algorithm that may be implemented for verifying that default passwords have been changed without causing a security lockout in accordance with the security verification system 100 described in FIG. 1 using one or more computer systems as defined generically in FIG. 5 below, and more specifically by the specific embodiments of FIG. 1.

Figure 3:
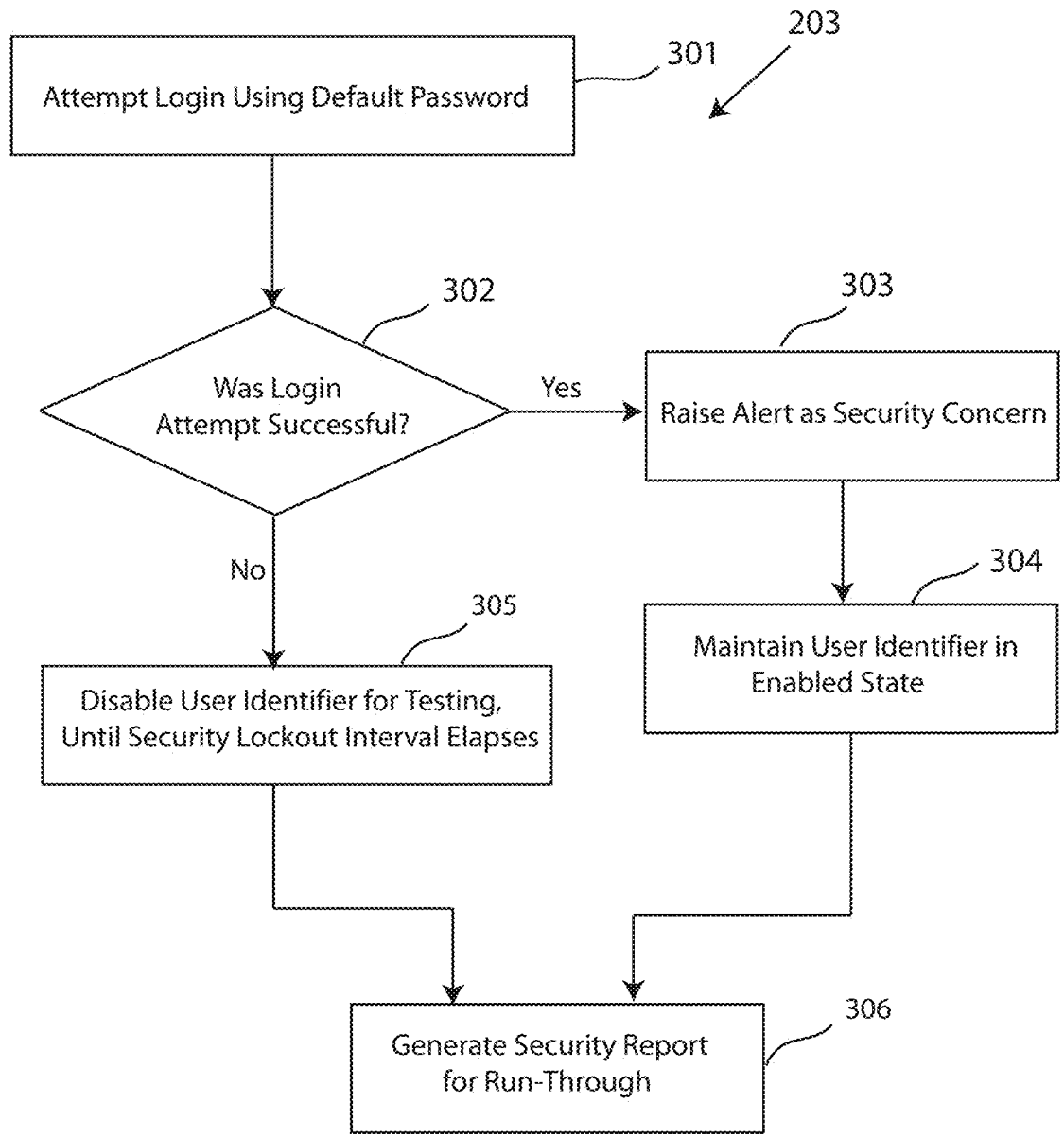
FIG. 3 depicts a flowchart of a step of the method of FIG. 2, in accordance with embodiments of the present invention.

Embodiments of the method 200 for verifying that default passwords have been changed without causing a security lockout may begin at step 201 wherein a user identifiers associated with the devices 110 may be enabled. During an initial security test run-through, all or each or each of the user identifiers associated with all of the devices 110 may be enabled to ensure a thorough evaluation of the devices 110. Step 202 identifies or otherwise obtains a default password for a user identifier for each device 110. Using the default password or default login information, step 203 attempts to login to each device. FIG. 3 depicts a block diagram of step 203 of the method of FIG. 2, in accordance with embodiments of the present invention. Step 301 attempts a login using default password (as performed in step 203). Step 302 determines whether the login attempt was successful. If yes, step 303 raises an alert regarding a potential security concern because an unauthorized party may login and/or access a device 100 using default login information. Raising an alert may include sending an electronic communication or may include sending a generated detail report of the security risk, along with a suggested action to correct the problem, including identifying information of the device, user, user identifier, etc. Further, step 304 maintains an enabled state for the user identifier so that one or more subsequent security tests check the user identifier after the alert interval has passed. If no, step 305 disables the user identifier for testing, until a security lockout interval elapses. The security lockout interval information may be stored in database 111 and/or data repository 125, by the computing system 120. Step 306 generates a security report for each run-through, which may be stored in database 111, and transmitted to appropriate parties/systems.

Figure 4:
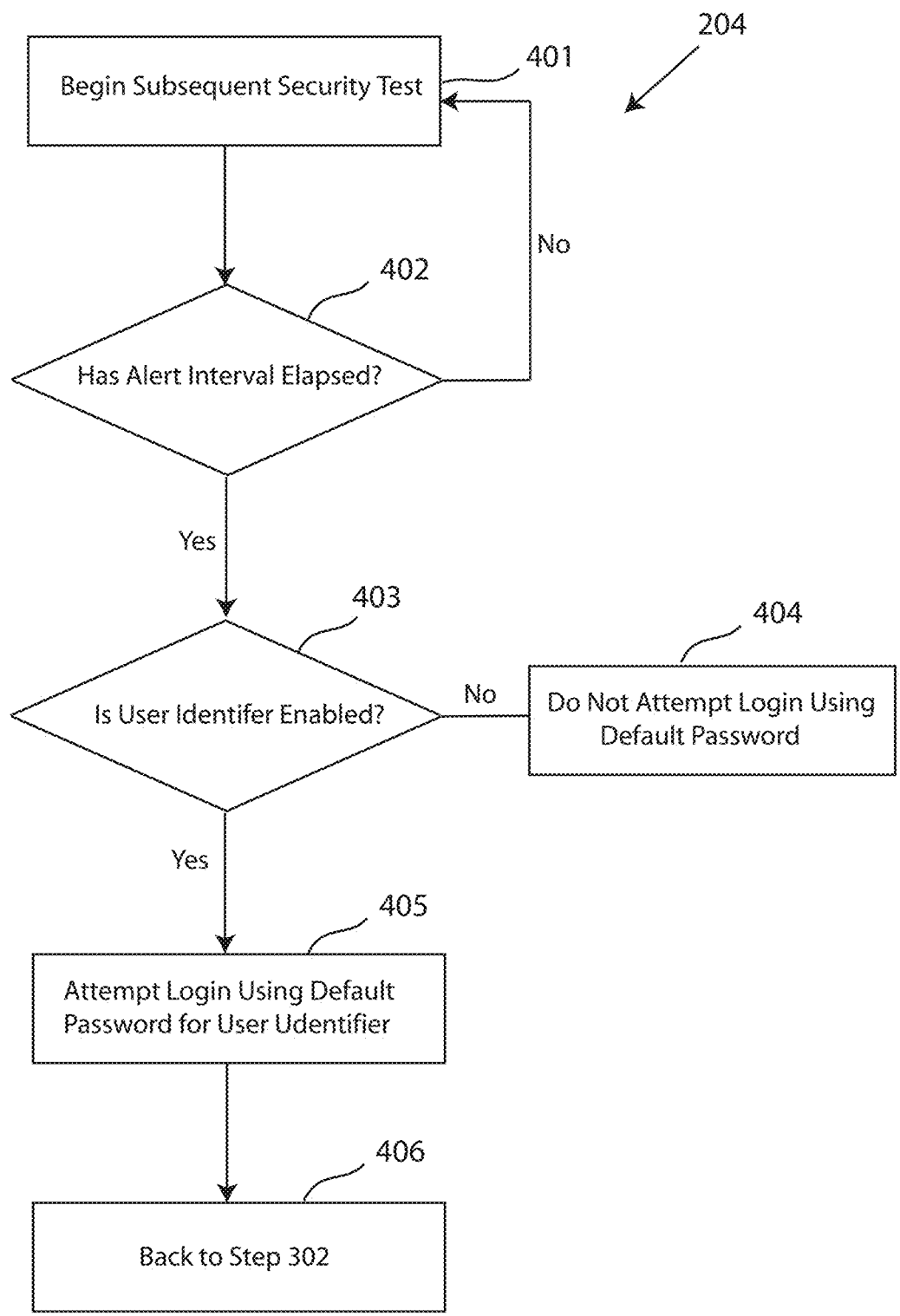
FIG. 4 depicts a flowchart of a step of the method of FIG. 2, in accordance with embodiments of the present invention.

Referring back to FIG. 2, step 204 retries the login attempt for each enabled user identifier. The subsequent or additional attempts to login may be performed during one or more subsequent security tests commended after an alert interval has elapsed; during the tests, the login attempts may be restricted to a single attempt. FIG. 4 depicts a block diagram of step 204 of the method of FIG. 2, in accordance with embodiments of the present invention. Step 401 begins or readies for a subsequent security test. Step 402 determines whether the alert interval has elapsed. For example, whether enough time passed between a conclusion of the initial or previous security and step 401. If no, the method returns to step 401. If yes, the retesting method continues to step 403, which determines whether each user identifier is enabled or in an enabled state. If no, then an attempt at a login for the user identifier does not occur, as indicated at step 404. If yes, step 405 attempts a login using default password for user identifier, and step 406 performs the method staring at step 302, which determines whether the login attempt was successful or not. The method 200 for verifying that default passwords have been changed without causing a security lockout may automatically continue (e.g. on a daily basis) to test and re-test unchanged default passwords while avoiding a disruption at the device.

Figure 5:
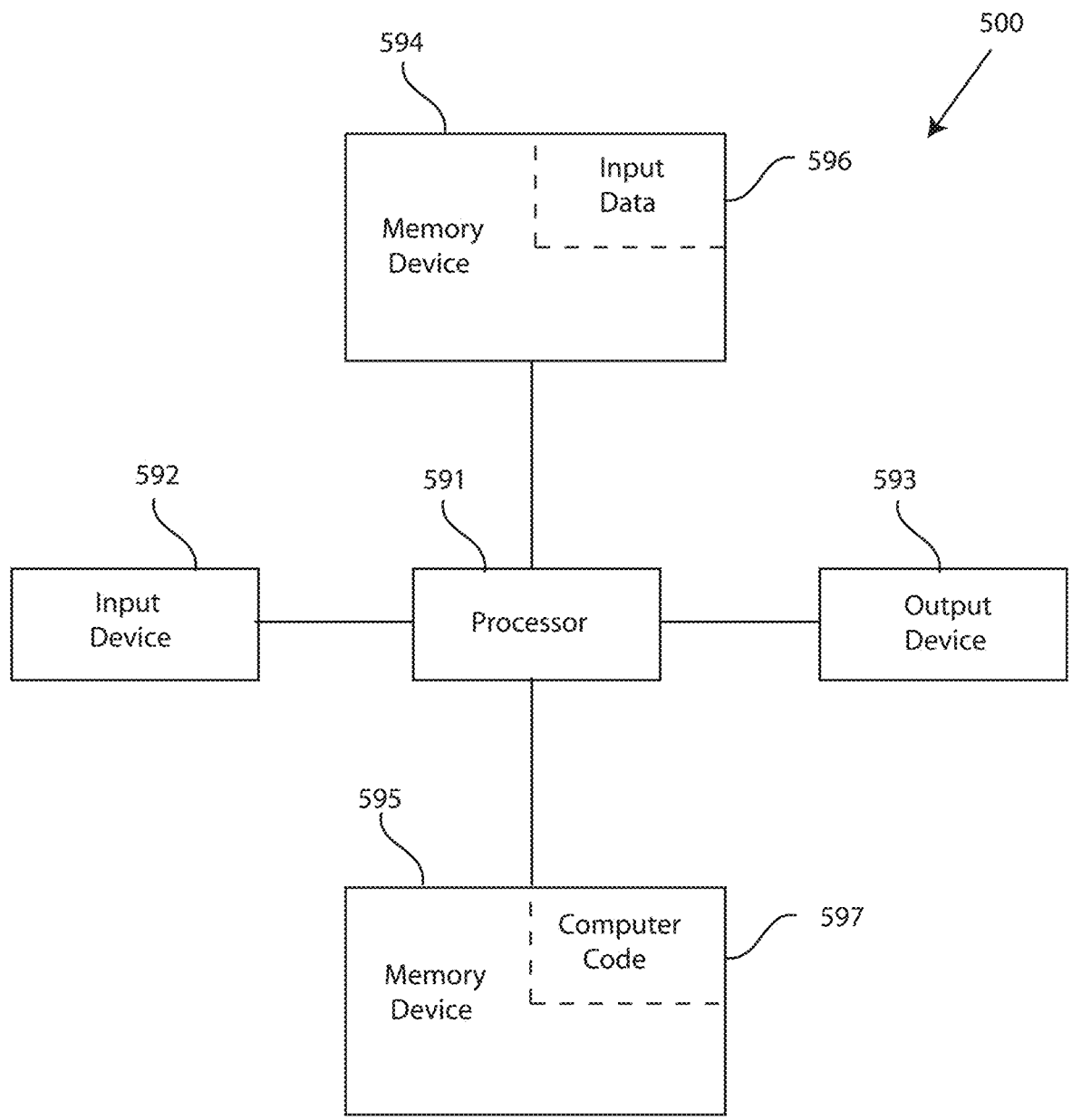
FIG. 5 depicts a block diagram of a computer system for the security verification system of FIG. 1, capable of implementing methods for verifying that default passwords have been changed without causing a security lockout of FIGS. 2-4, in accordance with embodiments of the present invention.

FIG. 5 illustrates a block diagram of a computer system for the security verification system of FIG. 1, capable of implementing methods for verifying that default passwords have been changed without causing a security lockout of FIGS. 2-4, in accordance with embodiments of the present invention. The computer system 500 may generally comprise a processor 591, an input device 592 coupled to the processor 591, an output device 593 coupled to the processor 591, and memory devices 594 and 595 each coupled to the processor 591. The input device 592, output device 593 and memory devices 594, 595 may each be coupled to the processor 591 via a bus. Processor 591 may perform computations and control the functions of computer 500, including executing instructions included in the computer code 597 for the tools and programs capable of implementing a method for verifying that default passwords have been changed without causing a security lockout, in the manner prescribed by the embodiments of FIGS. 2-4 using the security verification system of FIG. 1, wherein the instructions of the computer code 597 may be executed by processor 591 via memory device 595. The computer code 597 may include software or program instructions that may implement one or more algorithms for implementing the methods for verifying that default passwords have been changed without causing a security lockout, as described in detail above. The processor 591 executes the computer code 597. Processor 591 may include a single processing unit, or may be distributed across one or more processing units in one or more locations (e.g., on a client and server).

The memory device 594 may include input data 596. The input data 596 includes any inputs required by the computer code 597. The output device 593 displays output from the computer code 597. Either or both memory devices 594 and 595 may be used as a computer usable storage medium (or program storage device) having a computer readable program embodied therein and/or having other data stored therein, wherein the computer readable program comprises the computer code 597. Generally, a computer program product (or, alternatively, an article of manufacture) of the computer system 500 may comprise said computer usable storage medium (or said program storage device).

Memory devices 594, 595 include any known computer readable storage medium, including those described in detail below. In one embodiment, cache memory elements of memory devices 594, 595 may provide temporary storage of at least some program code (e.g., computer code 597) in order to reduce the number of times code must be retrieved from bulk storage while instructions of the computer code 597 are executed. Moreover, similar to processor 591, memory devices 594, 595 may reside at a single physical location, including one or more types of data storage, or be distributed across a plurality of physical systems in various forms. Further, memory devices 594, 595 can include data distributed across, for example, a local area network (LAN) or a wide area network (WAN). Further, memory devices 594, 595 may include an operating system (not shown) and may include other systems not shown in FIG. 5.

In some embodiments, the computer system 500 may further be coupled to an Input/output (I/O) interface and a computer data storage unit. An I/O interface may include any system for exchanging information to or from an input device 592 or output device 593. The input device 592 may be, inter alia, a keyboard, a mouse, etc. The output device 593 may be, inter alia, a printer, a plotter, a display device (such as a computer screen), a magnetic tape, a removable hard disk, a floppy disk, etc. The memory devices 594 and 595 may be, inter alia, a hard disk, a floppy disk, a magnetic tape, an optical storage such as a compact disc (CD) or a digital video disc (DVD), a dynamic random access memory (DRAM), a read-only memory (ROM), etc. The bus may provide a communication link between each of the components in computer 500, and may include any type of transmission link, including electrical, optical, wireless, etc.

An I/O interface may allow computer system 500 to store information (e.g., data or program instructions such as program code 597) on and retrieve the information from computer data storage unit (not shown). Computer data storage unit includes a known computer-readable storage medium, which is described below. In one embodiment, computer data storage unit may be a non-volatile data storage device, such as a magnetic disk drive (i.e., hard disk drive) or an optical disc drive (e.g., a CD-ROM drive which receives a CD-ROM disk). In other embodiments, the data storage unit may include a knowledge base or data repository 125 as shown in FIG. 1.

As will be appreciated by one skilled in the art, in a first embodiment, the present invention may be a method; in a second embodiment, the present invention may be a system; and in a third embodiment, the present invention may be a computer program product. Any of the components of the embodiments of the present invention can be deployed, managed, serviced, etc. by a service provider that offers to deploy or integrate computing infrastructure with respect to security verification systems and methods. Thus, an embodiment of the present invention discloses a process for supporting computer infrastructure, where the process includes providing at least one support service for at least one of integrating, hosting, maintaining and deploying computer-readable code (e.g., program code 597) in a computer system (e.g., computer 500) including one or more processor(s) 591, wherein the processor(s) carry out instructions contained in the computer code 597 causing the computer system to verify that default passwords have been changed without causing a security lockout. Another embodiment discloses a process for supporting computer infrastructure, where the process includes integrating computer-readable program code into a computer system including a processor.

The step of integrating includes storing the program code in a computer-readable storage device of the computer system through use of the processor. The program code, upon being executed by the processor, implements a method for verifying that default passwords have been changed without causing a security lockout. Thus, the present invention discloses a process for supporting, deploying and/or integrating computer infrastructure, integrating, hosting, maintaining, and deploying computer-readable code into the computer system 500, wherein the code in combination with the computer system 500 is capable of performing a method for verifying that default passwords have been changed without causing a security lockout.

A computer program product of the present invention comprises one or more computer readable hardware storage devices having computer readable program code stored therein, said program code containing instructions executable by one or more processors of a computer system to implement the methods of the present invention.

A computer system of the present invention comprises one or more processors, one or more memories, and one or more computer readable hardware storage devices, said one or more hardware storage devices containing program code executable by the one or more processors via the one or more memories to implement the methods of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
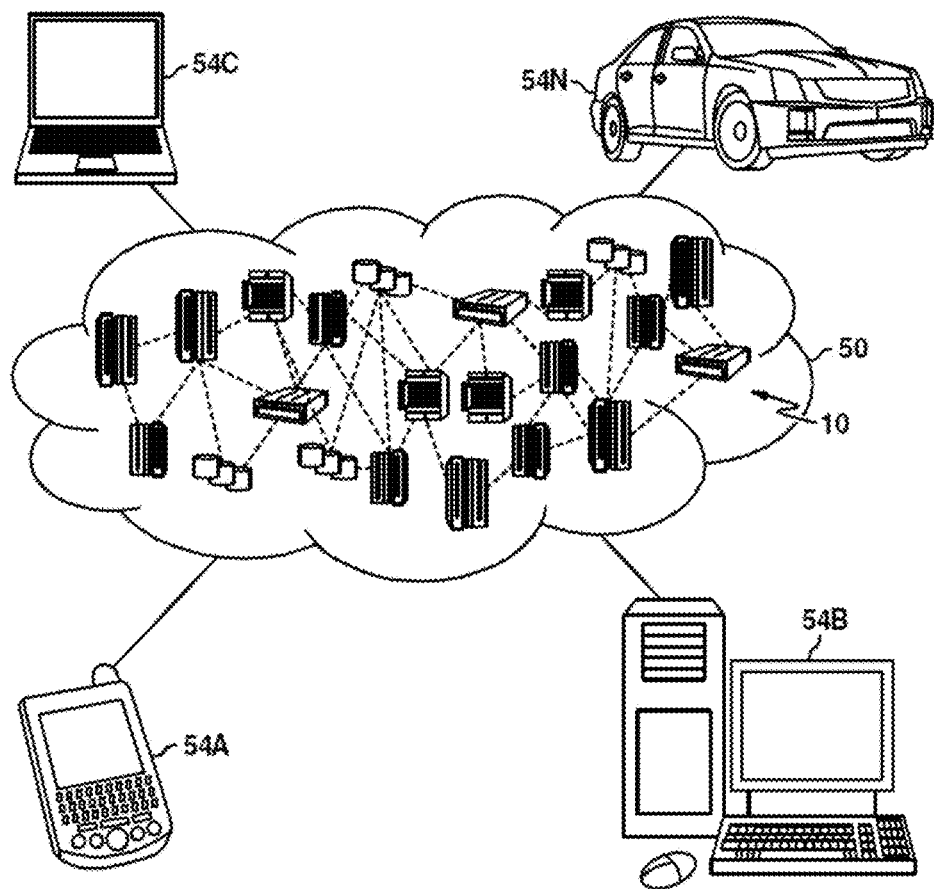
FIG. 6 depicts a cloud computing environment, in accordance with embodiments of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private. Community. Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 6 are intended to be illustrative only and that computing nodes 10 and cloud computing environment 50 can communicate with any type of computerized device over any type of network and/or network addressable connection (e.g., using a web browser).

Figure 7:
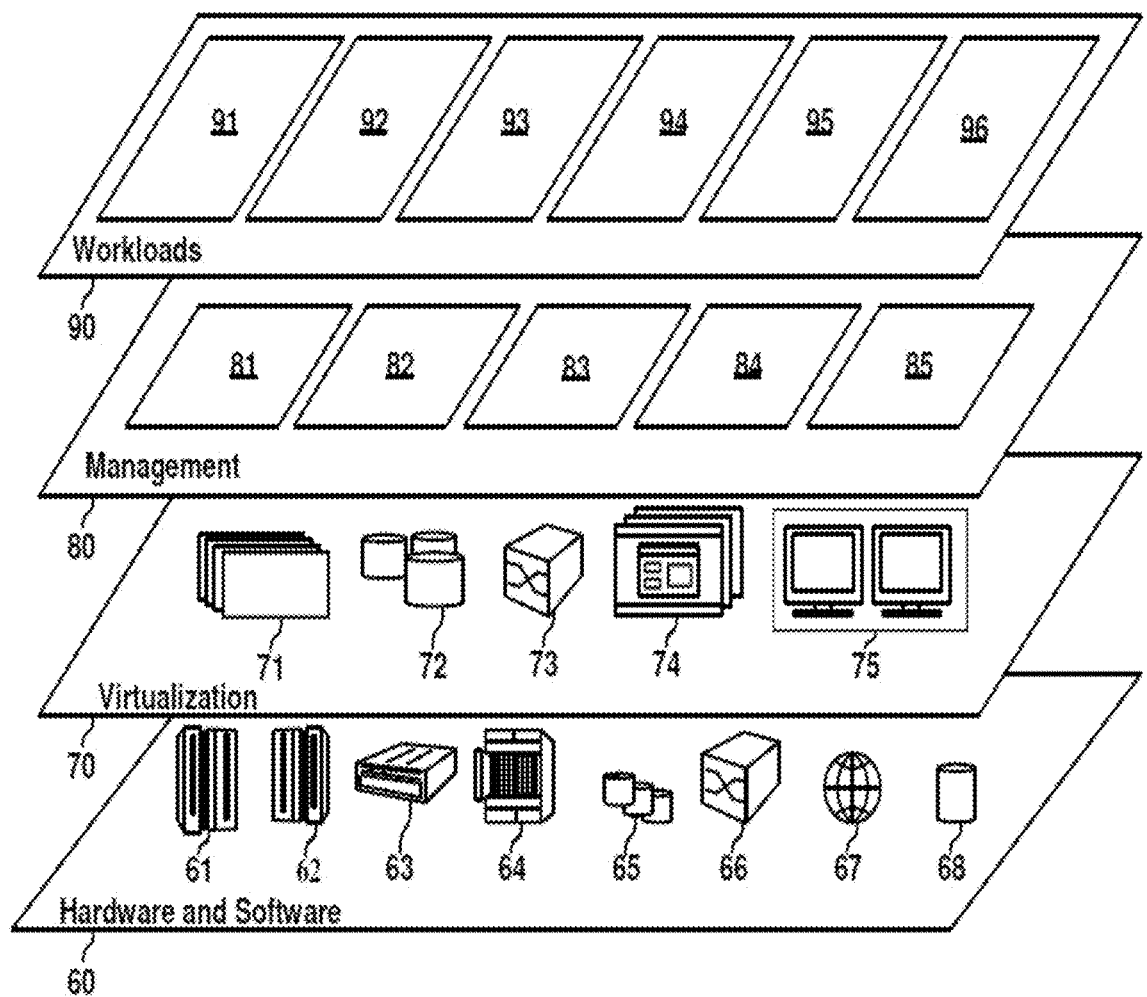
FIG. 7 depicts abstraction model layers, in accordance with embodiments of the present invention.

Referring now to FIG. 7, a set of functional abstraction layers provided by cloud computing environment 50 (see FIG. 6) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and security verification 96.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
    enabling for testing, by a processor of a computing system, user identifiers associated with a plurality of devices, prior to an initial security test;
    performing, by the processor, a login attempt to each device using a default password for the user identifier of each device as part of the initial security test to test each device to ensure that the default password has been changed by a user associated with the user identifier; and
    retrying, by the processor, a new login attempt only for each user identifier in an enabled state during one or more subsequent security tests initiated after a predetermined alert interval, thereby skipping login attempts for user identifiers in a non-enabled state so that a security lockout is avoided for users associated with the user identifiers in the non-enabled state.

2. The method of claim 1, further comprising generating, by the processor, a report including each device that was accessible using the default password.

3. The method of claim 1, wherein the login is attempted only a single time during the security test and the one or more subsequent security tests to avoid causing the device lockout for user identifiers that have changed the default password.

4. The method of claim 1, wherein the predetermined alert interval starts at a conclusion of the initial security test and one or more subsequent security tests, the conclusion occurring when the login has been attempted for each user identifier in an enabled state, for the plurality of devices.

5. The method of claim 1, wherein the predetermined alert interval is daily, and the security lockout interval is greater than 30 days.

6. The method of claim 1, further comprising storing, by the processor, enabling-state data associated with the user identifier in a database, such that the database is accessed during the one or more subsequent security tests to determine which user identifiers to attempt the login.

7. The method of claim 1, further comprising accessing, by the processor, a database to determine whether a default password information is being stored for a particular user identifier, and if so, skipping a login attempt for the particular user identifier during the initial security test and the one or more subsequent security tests.

8. A computer system, comprising:
    a processor;
    a memory device coupled to the processor; and
    a computer readable storage device coupled to the processor, wherein the storage device contains program code executable by the processor via the memory device to implement a method comprising:
        enabling for testing, by a processor of a computing system, user identifiers associated with a plurality of devices, prior to an initial security test;
        performing, by the processor, a login attempt to each device using a default password for the user identifier of each device as part of the initial security test to test each device to ensure that the default password has been changed by a user associated with the user identifier; and
        retrying, by the processor, a new login attempt only for each user identifier in an enabled state during one or more subsequent security tests initiated after a predetermined alert interval, thereby skipping login attempts for user identifiers in a non-enabled state so that a security lockout is avoided for users associated with the user identifiers in the non-enabled state.

9. The computer system of claim 8, further comprising generating, by the processor, a report including each device that was accessible using the default password.

10. The computer system of claim 8, wherein the login is attempted only a single time during the security test and the one or more subsequent security tests to avoid causing the device lockout for user identifiers that have changed the default password.

11. The computer system of claim 8, wherein the predetermined alert interval starts at a conclusion of the initial security test and one or more subsequent security tests, the conclusion occurring when the login has been attempted for each user identifier in an enabled state, for the plurality of devices.

12. The computer system of claim 8, wherein the predetermined alert interval is daily, and the security lockout interval is greater than 30 days.

13. The computer system of claim 8, further comprising storing, by the processor, enabling-state data associated with the user identifier in a database, such that the database is accessed during the one or more subsequent security tests to determine which user identifiers to attempt the login.

14. The computer system of claim 8, further comprising accessing, by the processor, a database to determine whether a default password information is being stored for a particular user identifier, and if so, skipping a login attempt for the particular user identifier during the initial security test and the one or more subsequent security tests.

15. A computer program product, comprising a computer readable hardware storage device storing a computer readable program code, the computer readable program code comprising an algorithm that when executed by a computer processor of a computing system implements a method comprising:
    enabling for testing, by a processor of a computing system, user identifiers associated with a plurality of devices, prior to an initial security test;
    performing, by the processor, a login attempt to each device using a default password for the user identifier of each device as part of the initial security test to test each device to ensure that the default password has been changed by a user associated with the user identifier; and
    retrying, by the processor, a new login attempt only for each user identifier in an enabled state during one or more subsequent security tests initiated after a predetermined alert interval, thereby skipping login attempts for user identifiers in a non-enabled state so that a security lockout is avoided for users associated with the user identifiers in the non-enabled state.

16. The computer program product of claim 15, further comprising generating, by the processor, a report including each device that was accessible using the default password.

17. The computer program product of claim 15, wherein the login is attempted only a single time during the security test and the one or more subsequent security tests to avoid causing the device lockout for user identifiers that have changed the default password.

18. The computer program product of claim 15, wherein the predetermined alert interval starts at a conclusion of the initial security test and one or more subsequent security tests, the conclusion occurring when the login has been attempted for each user identifier in an enabled state, for the plurality of devices.

19. The computer program product of claim 15, wherein the predetermined alert interval is daily, and the security lockout interval is greater than 30 days.

20. The computer program product of claim 15, further comprising storing, by the processor, enabling-state data associated with the user identifier in a database, such that the database is accessed during the one or more subsequent security tests to determine which user identifiers to attempt the login.

* * * * *